Feb. 17, 1953  T. F. KRUMM  2,628,430
WHEEL GAUGE
Filed Dec. 10, 1948  2 SHEETS—SHEET 1
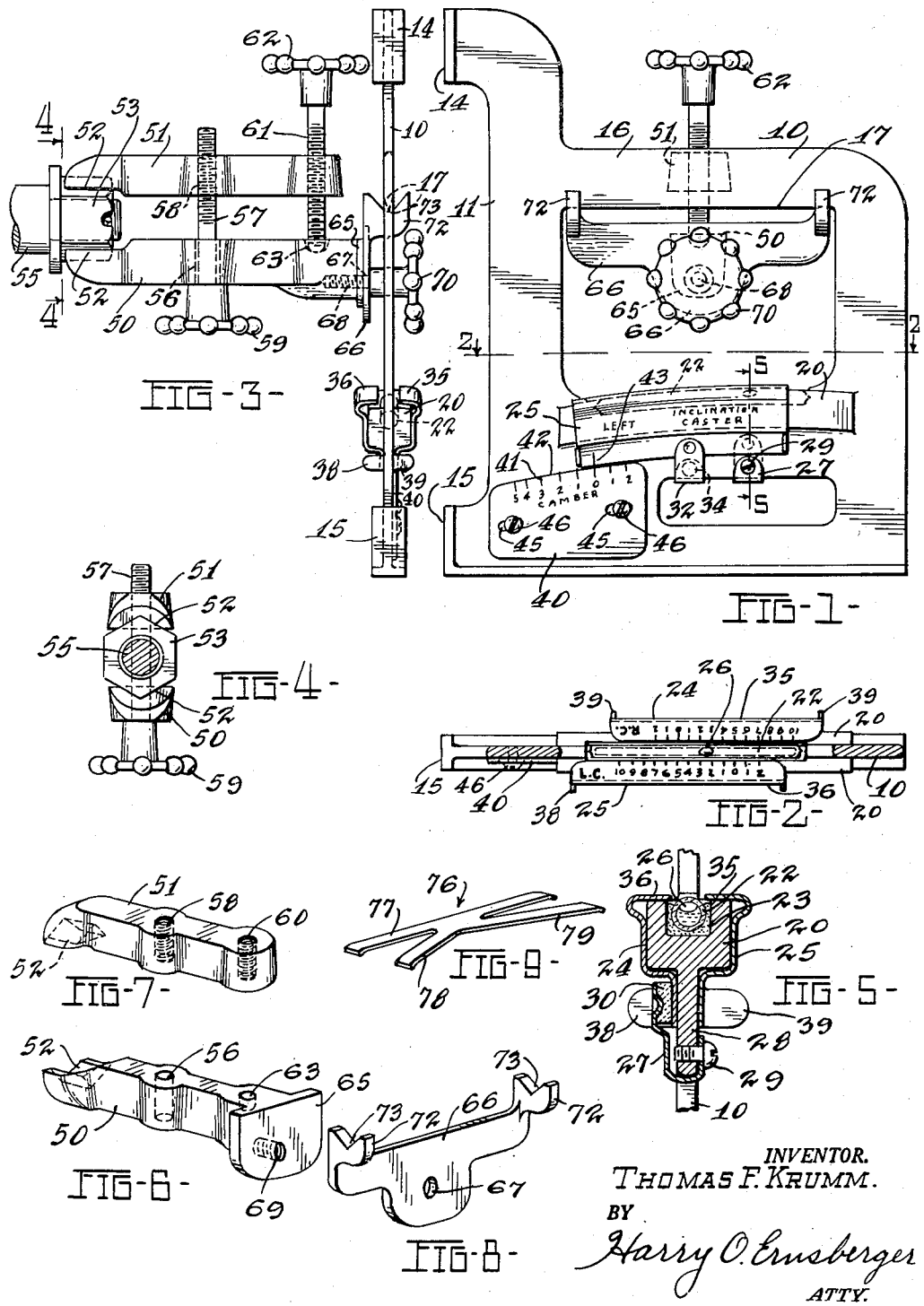
INVENTOR.
THOMAS F. KRUMM.
BY
Harry O. Ernsberger
ATTY.

Feb. 17, 1953      T. F. KRUMM      2,628,430
WHEEL GAUGE
Filed Dec. 10, 1948      2 SHEETS—SHEET 2
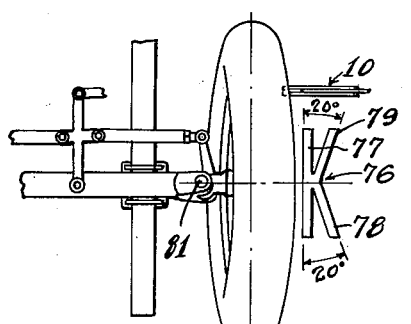
FIG-14-
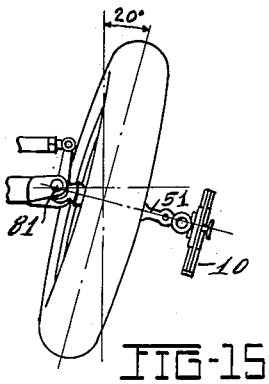
FIG-15-
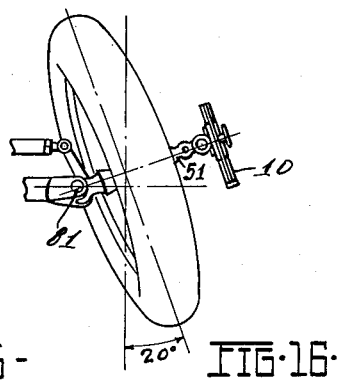
FIG-16-
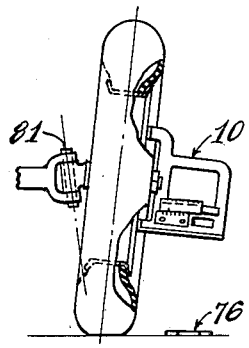
FIG-13-
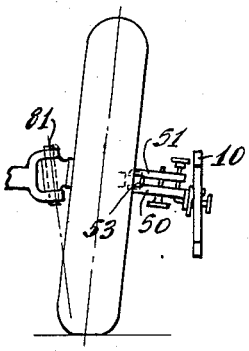
FIG-12-
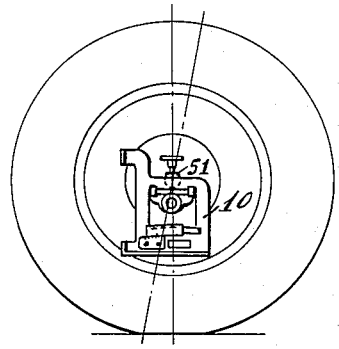
FIG-11-
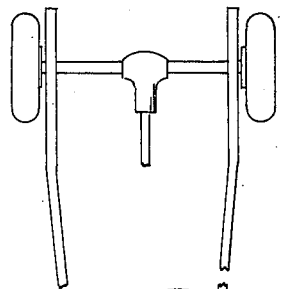
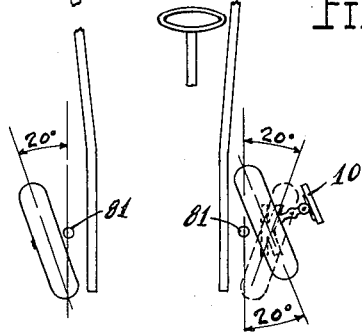
FIG-10-
INVENTOR.
THOMAS F. KRUMM.
BY
Harry O. Ernsberger
ATTY.

Patented Feb. 17, 1953

2,628,430

UNITED STATES PATENT OFFICE 2,628,430

WHEEL GAUGE

Thomas F. Krumm, Toledo, Ohio

Application December 10, 1948, Serial No. 64,553

3 Claims. (Cl. 33—203.18)

This invention relates to improvements in gauges and more particularly to gauges of a character for determining the condition of alignment of the steerable or dirigible wheels of a vehicle.

The invention contemplates the provision of a gauging apparatus for easily and quickly ascertaining the condition of camber, caster and inclination of the king pins of the steerable wheels of a vehicle.

The invention embraces the provision of a gauge of comparatively light weight for use in ascertaining the condition of camber, caster and king pin inclination of the steerable wheels of the vehicle in which such conditions are indicated upon suitable graduated scales.

An object of the invention is the provision of a simple yet effective and accurate means for determining caster of dirigible wheels utilizing adjustable calibrated members mounted for independent adjustment for determining caster of both right and left wheels.

Another object of the invention is the inclusion of a gauging means arranged to be brought into contact or engagement with the wheel felloe to obtain an indication of camber and to be suspended from the wheel spindle to obtain an indication of the angle of king pin inclination.

Another object of the invention is the provision of gauging means comprising an element arranged for direct contact with the wheel felloe or rim for obtaining camber and caster readings in combination with means for suspending the gauging means from a wheel spindle for obtaining a reading of king pin inclination or angularity in conjunction with a template or pattern for indicating the angular extent of movement of the front wheels in right and left hand positions.

Another object of the invention is the provision of a gauging apparatus for obtaining camber and caster indications and king pin inclination of dirigible vehicle wheels which is not expensive and is of small and compact construction adapted to be utilized by inexperienced operators without the use of special tools.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is an elevational view of a gauging means forming a component part of the present invention;

Figure 2 is a horizontal sectional view taken substantially on the line 2—2 of Figure 1;

Figure 3 is an elevational view of a means for supporting the gauging means from a wheel spindle for purposes of obtaining the angle of inclination of a king pin, the gauging means being shown in operative position;

Figure 4 is a vertical sectional view through a portion of the wheel spindle illustrating the gauge supporting means fixed thereto, the section being taken substantially on the line 4—4 of Figure 3;

Figure 5 is a fragmentary detail sectional view taken substantially on the line 5—5 of Figure 1;

Figure 6 is an isometric view showing an element of the gauge supporting means;

Figure 7 is an isometric view illustrating another element forming a part of the gauge supporting means;

Figure 8 is an isometric view illustrating a gauge supporting member;

Figure 9 is an isometric view of a template useable with the gauging means;

Figure 10 is a diagrammatic plan view of a vehicle chassis showing the steerable wheels turned to a left hand position;

Figure 11 is an elevational view of a vehicle wheel illustrating the gauging means in position for obtaining king pin angularity;

Figure 12 is a front elevational view of the arrangement shown in Figure 11;

Figure 13 is a front elevational view of a vehicle wheel partly in section illustrating the position of the gauging means of my invention in position for obtaining camber and caster readings;

Figure 14 is a plan view of a vehicle wheel and a portion of the chassis illustrating the gauging means in a position for obtaining camber and caster readings in conjunction with the template for indicating steering wheel angularity;

Figure 15 is a view similar to Figure 14 showing the vehicle wheel turned to its right hand position in securing an indication of king pin inclination, and Figure 16 is a view illustrating the vehicle wheel in its left hand angular position in securing an indication of king pin inclination.

While I have illustrated a form of my invention as utilized for obtaining camber, caster and king pin inclination indications of the steerable wheels of a vehicle, it is to be understood that I contemplate the utilization of my invention in determining angularities of other elements and in any environment wherever the invention may be found to have utility.

The steerable or dirigible wheels of motor vehicles are normally mounted and adjusted so that the front wheels are closer together at their point of contact with the road, this inclination being known as the camber of the wheel. Such wheels for steering purposes are movable about a king pin and the king pins supporting the stub axles for the wheels in the usual vehicle construction are inclined upwardly and rearwardly. This is referred to as caster.

The king pins are also inclined toward the intersection of the tire with the roadway as shown in Figures 12 and 13 and this angularity is usually referred to as king pin inclination. During the manufacture of automotive vehicles the dirigible or steerable wheels are adjusted at the factory for the correct camber, caster and king pin inclination, but the proper adjustment of the wheels may be disturbed because of road shock, collision, and the like, and in numerous cases impairing or changing the wheels position or alignment to an extent that the vehicle may not steer properly, tire wear increased abnormally, and the vehicle even tend to "shimmy" or "wander" as a result of improper alignment. The gauging structure of my invention provides a simple and effective means for detecting error in the camber, caster and king pin inclination of the steerable wheels and at the same time indicating the extent of such errors.

Referring to the drawings in detail and more especially to Figures 1 and 2 there is illustrated a form of gauging means which is inclusive of a gauge frame 10 of substantially rectangular configuration in which a vertical post 11 of the frame is provided with gauging surfaces 14 and 15. The surfaces 14 and 15 are of uniplanar pad-like configuration, the gauging surfaces being in alignment so that they lie in a single plane. Extending across an open portion of the frame 10 is a bar 16 the lower edge of which is fashioned with a suitable edge 17 for purposes to be hereinafter explained. Arranged beneath and extending across the frame is an arcuately shaped bar 20 integrally formed with the frame. The upper portion of the bar 20 is recessed to accommodate a liquid spirit indicator or level 22 which is embedded in a cementitious material 23. The liquid spirit indicator 22 is also of an arcuate configuration of substantially the same curvature as that of the bar 20. The bar 20 forms a track or guide for supporting slidable members or indicators 24 and 25, the indicator 24 being adapted to indicate the angularity of caster and king pin inclination of the right wheel of a vehicle while the member 25 is arranged to indicate caster angularity and king pin inclination of a left wheel. As particularly shown in Figure 5, there is provided resilient means for yieldably retaining the slidable members in adjusted position. As illustrated a clip 27 is secured to the lower web portion 28 of bar 20 by means of a screw 29. The clip 27 projects upwardly and is provided with a pad 30 of fibrous or other suitable material which engages the member 25 in a manner to frictionally retain the member 25 in adjusted position. A similar clip 32 is secured to the web 28 and is adapted for frictional engagement with the member 25. The clip 32 is secured to the web 28 by means of screw 34. The members 24 and 25 are respectively formed with transversely extending portions 35 and 36 bearing graduations suitably spaced and calibrated to indicate angles of king pin inclination and caster. The members 24 and 25 are respectively formed with projecting ears 38 and 39 for ease in manipulating the slidable members.

The frame 10 is also provided with a plate 40 provided with graduations or calibrations 41 for indicating condition of camber of vehicle wheels. The upper edge 42 of the plate 40 is arcuately shaped to substantially the same curvature as the lower edge of the slidable member 25. The member 25 being in juxtaposition with the upper edge 42 of the plate 40 is provided with an index 43 arranged for cooperation with the graduations 41 on the plate 40. The plate 40 is provided with a pair of slots 45 to accommodate screws 46 for securing the plate 40 to the frame 10, the slots 45 providing for an initial adjustment of the plate to establish the proper correlation between the index 43 and the graduations 41 on the plate 40.

As shown in Figure 2 it is to be noticed that the slidable member 24 for indicating right caster is provided with graduations from zero to 10 in a right hand direction as viewed in Figure 2 and from zero to 2 in a left hand direction. The graduations from zero extending in a right hand direction indicate positive caster while the graduations extending in a left hand direction indicate negative caster. On the slide 25, the graduations extending to the left of zero mark indicate positive caster and the graduations to the right of the zero mark indicate negative caster.

The gauge hereinbefore described is utilized to obtain an indication of camber and caster by bringing the pad portions 14 and 15 into engagement with the felloe of the wheel and moving the wheel to angular positions in a manner to be hereinafter explained.

The gauging means of my invention is arranged to indicate the inclination of king pins of the steerable wheels of a vehicle by associating the gauging means with the wheel spindle. To this end I have provided an arrangement for supporting the gauging means from a wheel spindle. This supporting means is inclusive of members 50 and 51 having jaw portions 52 which are adapted to engage and be clamped to the wheel securing nut 53 carried by a threaded portion of the wheel spindle 55 as shown in Figures 3 and 4. The member 50 is provided with an opening 56 through which extends a threaded bolt 57, the latter being threaded into a threaded opening 58 formed in member 51 in alignment with the opening 56 in member 50. The bolt 57 is provided with a hand wheel 59 for manipulating the bolt. The member 51 is provided with a threaded opening 60 to receive a threaded member or bolt 61 the latter being provided with a hand wheel 62 for manipulating the bolt. Formed in member 50 in alignment with the opening 60 is a recess or depression 63 arranged to accommodate the extremity of the bolt 61 as shown in Figure 3. By manipulating of the hand wheels 59 and 62 the members 50 and 51 may be adjusted to fit various sizes of wheel securing nuts.

The member 50 is formed at its outer end with a pad portion 65 forming an abutment against which is positioned a support or member 66 for carrying the gauge frame 10. The member 66 is provided with an opening 67 adapted to accommodate a threaded bolt 68, the latter adapted to extend into a threaded opening 69 formed in the pad portion 65. The bolt 68 is provided with a hand wheel 70 whereby the member 66 may be angularly adjusted with respect to member 50 and held in adjusted position by drawing up the bolt through the medium of the hand wheel 70.

The member 66 is formed with spaced integrally projecting portions 72 configurated with V-shaped recesses 73 whereby the gauge frame 10 may be supported on member 66 by engagement of the edge 17 with the V-shaped recesses in the projections 72.

In order that the movement to right and left hand positions of the steerable wheels may be of the same angularity, I have provided a template to assure the operator of moving the steerable wheels to the proper position. The template is illustrated in Figures 9 and 14 and is formed with a straight edge portion 77 and two angularly divergent portions 78 and 79. As indicated in Figure 14 each of the portions 78 and 79 form with the straight edge 77, included angles of 20°. In the use of the template the same is placed upon the floor or roadway as indicated in Figures 13 and 14 with the straight edge 77 in parallel alignment with the plane of a dirigible wheel when the latter is positioned in "straight ahead" position. The template is maintained in this position so that when the operator swings the steerable wheels to the positions shown in Figures 15 and 16, the plane of the wheel will be in alignment with the direction of portions 78 and 79 dependent upon the direction in which the steerable wheels are turned.

The operation of the device is as follows: When it is desired to ascertain the camber or the amount of wheel inclination with respect to a theoretical vertical line, the vehicle is placed on a level floor with the dirigible wheels in a "straight ahead" position and the tires substantially evenly inflated. The camber indicating slide 25 is then adjusted through the medium of one of the projections 39 until the index 43 is in registration with the zero graduation on the camber scale 40. In this position with the pads 14 and 15 in a vertical position, the center of the bubble 26 in glass 19 will be in registration with the zero mark of the calibrations on slide 25. The contact points or pads 14 and 15 of the gauge are then placed against the felloe of a dirigible wheel as shown in Figure 13. The operator then notes the position of the bubble 26 with respect to the calibrations on the slide 25, and moves the slide to bring the zero index of the slide in registration with the bubble 26. The operator then notes the graduation 41 in registration with the index 43 on the slide which indicates the camber of the wheel.

In utilizing the gauge for testing caster, the wheels of the vehicle are first moved by means of the steering mechanism to the "right" position. In testing the left hand wheel as viewed from the vehicle operator's compartment, the gauge is placed against the forward portion of the felloe of this wheel. The "left" caster slide 25 is then adjusted until the zero mark on the slide 25 registers with the center of the bubble 26 in the glass 22. The wheel is then moved to the "left" position with the gauge in the same relative position on the wheel. The bubble 26 will assume a new position in the glass 22 because of caster angularity, and the calibration on the slide 26 in registration with the bubble indicates the amount of caster for the left hand wheel.

In testing for caster of the right hand wheel, the steerable wheels are moved by the steering mechanism to the "right" direction with the gauge contacting the forward portion of the felloe of the right hand wheel in the same relative position as was utilized for testing the "left" wheel. The "right caster" slide 24 is then adjusted until the zero calibration on this slide is in registration with the center of the bubble 26. After this operation has been performed, the steering wheels of the vehicle are then moved to the "left" and with the gauge in the same position on the wheel, the calibration on the slide 24 in registration with the bubble 26 indicates the amount of caster of the right hand wheel.

When it is desired to test for king pin inclination the procedure is as follows: The steerable wheels of the vehicle are turned to the right hand position, that is 20° from a "straight ahead" position the template 76 serving to apprise the operator of the proper angularity of the wheel. The operator then places the gauge frame 10 so that the pad portions 14 and 15 contact the wheel felloe as shown in Figure 13. The right hand slide 24 used for testing right hand caster is then slidably moved to a position bringing the zero index on the slide in registration with the bubble 26. The gauge frame 10 is then brought into contact with the left hand wheel and left caster slide 25 is slidably adjusted until the zero index thereof registers with the bubble 26 in the spirit level 22.

The operator then secures the supporting members 50 and 51 to the wheel spindle nut 53 in the manner shown in Figures 3 and 12, the support being clamped to the nut by manipulation of the hand wheels 59 and 62. With the vehicle wheel still turned to its right hand position the operator places the gauge frame 10 in engagement with the V-configuration 73 on the member 66 with the slide 24 outward or toward the operator and the member 66 tilted or adjusted about the axis of bolt 68 until the bubble 26 is in registration with the zero index on the right caster slide 24. The operator then swings the steerable wheels to the extreme left position as indicated by the template 76 which operation, by reason of the inclination of the king pin 81, shifts the position of the gauge frame resulting in a movement of the bubble 26 in the spirit level. The particular graduation on the slide 24 then in registration with the new position of the bubble 26 indicates the angularity in degrees of the king pin with respect to a vertical position which is referred to as king pin inclination.

To obtain a corresponding indication of king pin inclination for the left hand wheel, the supporting members 50 and 51 are clamped to the wheel spindle nut of the left hand wheel and the member 66, with the gauge suspended thereon having the slide 25 outward or toward the operator, adjusted to bring the bubble 26 in registration with the zero index on the left caster slide 25. Subsequently the steerable wheels are turned to a left hand position and the graduation on the slide 25 then in registration with the bubble 26 indicates in degrees the king pin inclination for the king pin of the left hand steerable wheel.

Through the foregoing described arrangement I have provided a simple yet effective means for obtaining an indication of wheel camber, wheel caster and king pin inclination and one which may be used by unskilled individuals.

It is apparent that, within the scope of the invention, modifications and different arrangements may be made other than is herein disclosed, and present disclosure is illustrative merely, the invention comprehending all variations thereof.

I claim:

1. A gauging means for ascertaining the condition of dirigible vehicle wheels including, in combination, a frame; an arcuately shaped liquid spirit indicator carried by said frame; a member slidably mounted upon said frame and arranged adjacent the said liquid spirit indicator; a plate adjustably supported upon said frame; a plurality of graduations on said plate; an index on said slidable member arranged for cooperation with the graduations on said plate; means for supporting said frame from a vehicle wheel spindle; said supporting means including a pair of members adapted to be secured in fixed relation with respect to a vehicle wheel spindle; an element mounted upon one of said members and adjustable relative thereto; said frame being formed with an edge portion; said element being formed with V-shaped portions adapted to receive the edge of said frame whereby said frame is movable with said wheel spindle and arranged for free suspension in the V-shaped portion of said element.

2. A gauging means for ascertaining the condition of dirigible vehicle wheels including, in combination, a frame; a curved liquid spirit indicator carried by said frame; a member slidably mounted upon said frame and arranged adjacent the said liquid spirit indicator; means for supporting said frame from a vehicle wheel spindle; said supporting means including clamping members adapted to be secured in fixed relation with respect to a vehicle wheel spindle; an element mounted upon one of said members and adjustable relative thereto; said frame being formed with a pivotal edge portion; said element being formed with a V-shaped portion adapted to receive the edge of said frame whereby said frame is movable with said wheel spindle and arranged for free suspension in the V-shaped portion of said element.

3. Gauging means of the character described including a frame; a liquid spirit indicator carried by the frame; a member slidably supported upon the frame and having graduations thereon cooperable with the liquid spirit indicator; means for suspending the frame including a support formed with spaced V-shaped portions; clamping means for securing the frame suspension support to a vehicle wheel spindle; said suspension support being adjustable with respect to the clamping means for adjusting the relative position of the frame with respect to the wheel spindle, said frame having a bar shaped portion engageable in said spaced V-shaped portions.

THOMAS F. KRUMM.

REFERENCES CITED

The following references are of record in the file of this patent:

UNITED STATES PATENTS

| Number | Name | Date |
|---|---|---|
| 397,294 | Karr | Feb. 5, 1889 |
| 2,115,347 | Sutton | Apr. 26, 1938 |
| 2,223,683 | Gruber | Dec. 3, 1940 |
| 2,235,321 | Krumm | Mar. 18, 1941 |
| 2,295,184 | Sandbo | Sept. 8, 1942 |
| 2,378,631 | Holmes | June 19, 1945 |

FOREIGN PATENTS

| Number | Country | Date |
|---|---|---|
| 121,822 | Great Britain | Jan. 7, 1919 |